United States Patent
Dünzinger et al.

(10) Patent No.: US 6,773,058 B2
(45) Date of Patent: Aug. 10, 2004

(54) COVER FOR A MOTOR VEHICLE ROOF AND PROCESS FOR ITS PRODUCTION

(75) Inventors: Christian Dünzinger, Pfaffenberg (DE); Thomas Schröferl, Hohenschaftlarn (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/268,077

(22) Filed: Oct. 10, 2002

(65) Prior Publication Data

US 2003/0085595 A1 May 8, 2003

(30) Foreign Application Priority Data

Oct. 11, 2001 (DE) .......................................... 101 50 011

(51) Int. Cl.[7] .............................................. B60J 7/043
(52) U.S. Cl. ................................................. 296/216.09
(58) Field of Search ........................ 296/216.06–216.09

(56) References Cited

U.S. PATENT DOCUMENTS

| | | | |
|---|---|---|---|
| 4,738,482 A | | 4/1988 | Boehm et al. |
| 4,925,237 A | * | 5/1990 | Bohn et al. ............ 296/216.09 |
| 6,491,341 B2 | * | 12/2002 | Grimm et al. ......... 296/216.09 |
| 6,540,289 B2 | * | 4/2003 | Bergmiller et al. .... 296/216.09 |

FOREIGN PATENT DOCUMENTS

| | | | |
|---|---|---|---|
| DE | 198 08 113 A1 | 9/1988 | |
| DE | 37 42 719 A | 7/1989 | |
| DE | 3822721 | * 12/1989 | ............ 296/216.09 |
| DE | 199 23 725 C | 7/2000 | |
| EP | 0 925 977 A | 6/1999 | |
| EP | 1 080 962 A | 3/2001 | |
| JP | 404345525 | * 12/1992 | ............ 296/216.09 |

* cited by examiner

Primary Examiner—Dennis H. Pedder
(74) Attorney, Agent, or Firm—Nixon Peabody LLP; David S. Safran

(57) ABSTRACT

A cover (9) for a motor vehicle roof with a cover body (10) which is peripherally injected, especially peripherally foamed, in the area of its outside edge so as to form a plastic frame (31) with a metal insert (14). The metal insert (14) extends frame-like along essentially the entire periphery of the cover (9), but is made in several parts in the peripheral direction of the cover. The metal insert (14) is only partially encompassed by the plastic frame. According to the process for producing the cover (9), for peripheral foaming, the cover body (10) together with the multi-part metal insert (14) is inserted into a foaming tool. Then, the foam compound is introduced, and to limit penetration of the foam compound to the inside, a seal is inserted into the peripheral channel (23) of the metal insert.

11 Claims, 3 Drawing Sheets

COVER FOR A MOTOR VEHICLE ROOF AND PROCESS FOR ITS PRODUCTION

BACKGROUND OF THE INVENTION

Field of the Invention

This invention relates to a cover for a motor vehicle roof with a cover body which is peripherally injected, especially peripherally foamed, in the area of its outside edge so as to form a plastic frame with a metal insert and a process for producing one such cover.

A cover with the above is known from published German Patent Application DE 198 08 113 A1. It is a glass composite element, especially in the form of a sliding glass roof for motor vehicles, which has a glass pane which is peripherally foamed on the outside edge with a plastic frame, preferably holding parts formed by angle sheets being peripherally foamed at the same time on two opposing sides of the glass composite element and being completely covered by the plastic frame.

SUMMARY OF THE INVENTION

The object of this invention is to devise a cover for a motor vehicle roof which, compared to the known cover, has increased torsional stiffness and a relatively small amount of foaming compound is sufficient for its manufacture. Compared to likewise known glass covers with an integral reinforcing frame, simplified production and flexible adaption to different cover dimensions and/or cover arches will be possible.

Proceeding from a cover for a motor vehicle roof with a cover body which is peripherally injected in the area of its outside edge with the formation of a plastic frame with a metal insert, and which is especially peripherally foamed, this object is achieved according to the invention by the metal insert extending frame-like along essentially the entire periphery of the cover, but being made in several parts in the peripheral direction of the cover, and the metal insert being only partially encompassed by the plastic frame.

In spite of the metal insert being composed of several parts, high torsional stiffness is obtained, because reinforcing insert parts are present not only on the side cover edges, but in practice in the entire peripheral area of the cover. Compared to an integral reinforcing frame, on the other hand, large sensitive sheet metal parts which are complex in terms of production, packaging, transport and storage are avoided. This is associated with major cost savings. Moreover, relatively simple adaption to different cover shapes and cover dimensions is possible. For example, to produce covers of the same length, but different width, identical side reinforcing parts can be used, or to produce covers of the same width, but different length, the same front and back reinforcing parts can be used. Furthermore, the only partial peripheral foaming of the metal insert generally saves expensive foam compound, and it enables lower cover weights.

Preferably, the cover is formed such that the plastic frame covers the outside edge area of the metal insert, conversely inside areas of the metal insert are left exposed.

Preferably, the metal insert has a peripheral bead, the base of which adjoins the bottom of the cover body, and the plastic frame extends to the inside as far as the outside wall of this peripheral bead.

In this case, a production process is especially suited in which, for peripheral foaming, the cover body together with the multi-part metal insert is inserted into a foaming tool and then foam compound is introduced, to limit penetration of the foaming mass to the inside, a seal being inserted into the peripheral channel of the metal insert. This seal can advantageously be reinforced in the area of the separation points between the insert parts by means of an auxiliary seal.

The metal insert is preferably divided into four parts in the peripheral direction of the cover, each insert part extending essentially along one of the four cover sides. On at least one part of the insert parts, feasibly on the side reinforcing parts facing one another, there can be cover holding devices or the like which extend downward through the plastic frame, especially holding devices for joining the cover to a cover adjustment mechanism, as is known for sliding roofs, sliding and lifting roofs and the like.

The cover body can be made especially of glass or transparent plastic. Among others, mainly PUR foam is suitable for the plastic frame.

According to another preferred embodiment of the invention, the plastic frame additionally forms side screens for covering lateral gaps between the cover and the fixed roof skin when the cover is raised.

One embodiment of the invention is explained in detail below using the accompanying drawings.

DETAILED DESCRIPTION OF THE INVENTION

Figure 1:
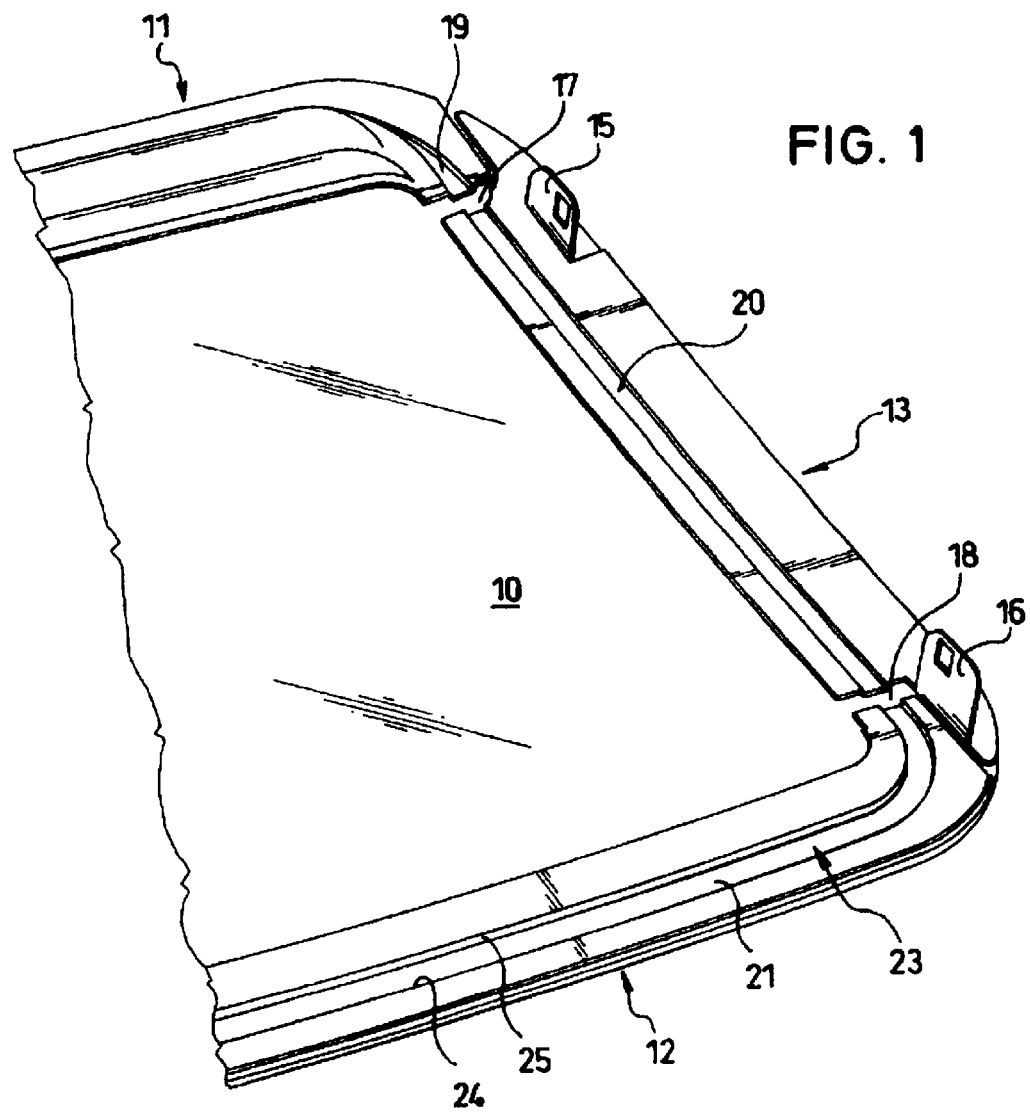
FIG. 1 is a perspective partial overhead view of the bottom of the cover body with the insert parts placed thereon.
Figure 2:
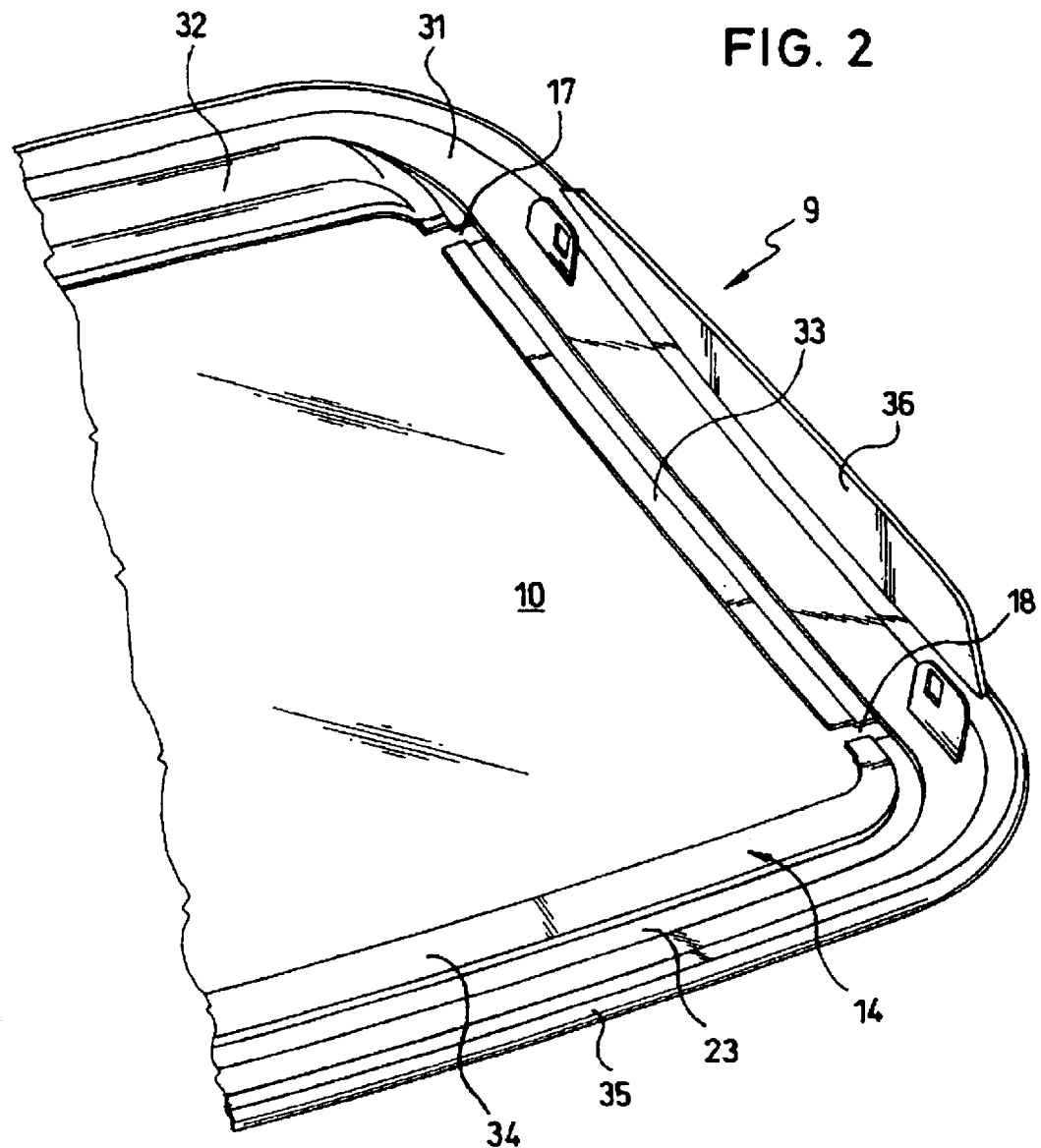
FIG. 2 is a perspective partial overhead view according to FIG. 1 after peripheral foaming.

According to FIG. 1, the cover 9 in FIG. 2 has an essentially rectangular cover body 10, which is formed preferably by a glass pane or is made of transparent plastic. Four insert parts of sheet metal, of which FIG. 1 and FIG. 2 show only 3, one front reinforcing part 11, a rear reinforcing part 12 and one reinforcing part 13 of the two lateral reinforcing parts, are placed on that side of the cover body 10 which represents the bottom for a cover installed in the motor vehicle roof. Each insert part extends essentially along one of the four cover sides or cover edges. The four insert parts are profiled according to the purpose in order to ensure the required cover stiffness and the insert parts represent together a four-part metal insert 14 or reinforcing frame. From the side reinforcing part 13 two cover holding devices 15 and 16 are angled in the direction essentially perpendicular to the plane of the cover body 10. The corresponding also applies to the second lateral reinforcing part which is not shown and which can be made mirror-symmetrical to the reinforcing part 13.

The four reinforcing insert parts 11, 12, 13 and a part mirror-imaged to part 13, but not shown, are separated from one another by four, preferably angled gaps, of which, in FIGS. 1 & 2, a gap 17 between the insert parts 11 and 13 and a gap 18 between the insert parts 12 and 13 can be seen. These gaps 17, 18 allow different thermal expansions of the cover body 10 and the reinforcing insert parts. Each of the insert parts is provided with a channel 19, 20, or 21, with a base 22 which adjoins the bottom of the cover body 10 and is connected to it via a cement/sealing bead or the like (not shown). The channels 19, 20, 21 are aligned with one another at the gaps 17, 18, and together with the channel which corresponds to the channel 20 of the insert part which is not shown, they form the metal insert channel 23 which runs peripherally in the cover edge area, is interrupted only by the gaps between the individual insert parts, and has an outside wall 24 and an inside wall 25.

Figure 4:
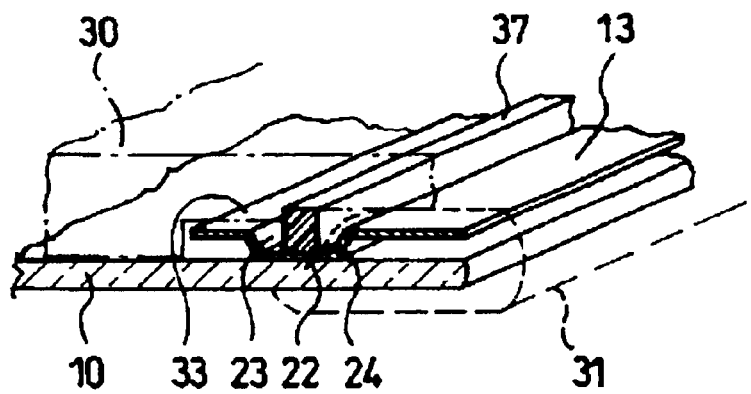
FIG. 4 shows, in a perspective cross section, a main seal which is inserted into the arrangement for peripheral foaming.
Figure 5:
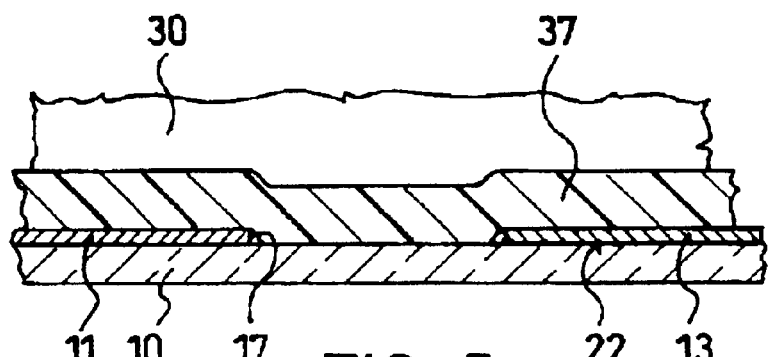
FIG. 5 is a cross-sectional view taken along the main seal in the area between two insert parts.

The arrangement as shown in FIG. 1 is inserted into a foaming tool 30 which is shown only schematically in FIGS. 4 & 5, and in the area of its outside edge, is peripherally foamed with foam mass, preferably PUR, so as to form an uninterrupted plastic frame 31 which runs around it. The plastic frame 31 provides for attachment of the insert parts to the cover body 10. The foam mass does not completely cover the metal insert 14 which is formed by the insert parts 11 to 13 and the fourth insert part which is not shown, but it extends only over its outside edge area, in this preferred embodiment, as far as the outside wall 24 of the metal insert channel 23. Inside areas 32, 33, 34 of the insert parts are left exposed, free of the foam mass.

A peripheral cover seal 35 extends along the outside edge of the plastic frame 31. The cover seal 35 can be inserted into a corresponding holding groove of the plastic frame 31 or can be molded onto the plastic frame 31 from a material with higher elasticity.

In particular, when the cover 9, in the installed state, is raised above the fixed motor vehicle roof surface, the plastic frame 31, as follows from FIG. 2, forms side screens 36 which project down, of which only one is shown in FIG. 2. The height of the screens 36 increases from front to back according to the inclination of the cover 9 in the raised state.

Figure 3:
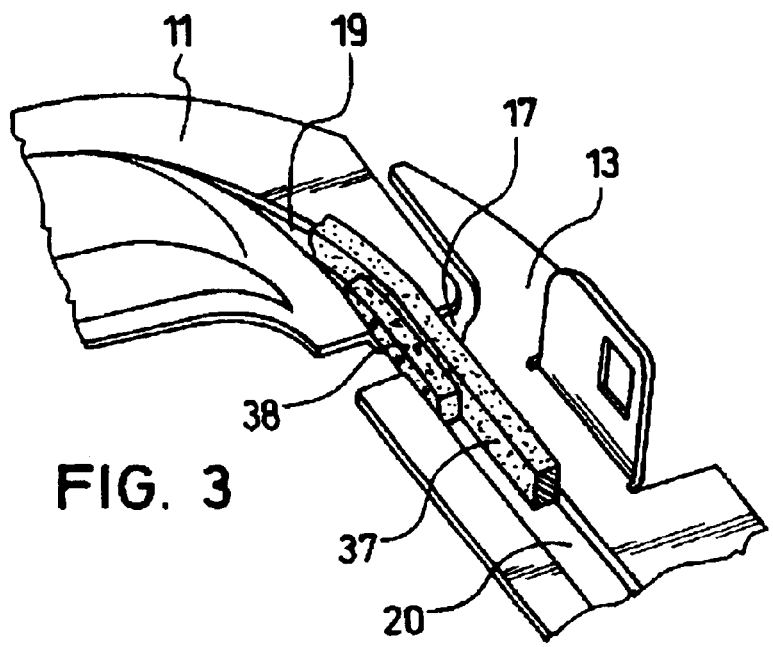
FIG. 3 is enlarged a partial overhead view of the upper corner area of the arrangement shown in FIG. 1, seals being shown in order to limit the penetration of the foam material during peripheral foaming.

In order to prevent penetration of the foam compound to the inside beyond the outside wall 24 of the channel 23 during peripheral foaming, according to FIGS. 3 to 5, a peripheral main seal 37 is inserted into the channel 23. This seal, shown cutaway in FIG. 3, is pressed during the foaming process by the foaming tool 30 against the side of the channel 23 which is at the top in the Figures and in the area of the gaps 17, 18 against the cover body 10. Here, the gap area is especially critical with respect to proper sealing. In order to support the sealing action of the peripheral main seal 37 in the area of the gaps 17, 18, there is an auxiliary seal 38 there in addition. As follows from FIG. 3, the auxiliary seal 38 is located on the inside of the main seal 37 and it is wider than the gap 17 or 18 so that it extends in the peripheral direction by a short distance on both sides beyond the gap.

What is claimed is:

1. Cover for a motor vehicle roof comprising:
   a cover body;
   a peripherally molded-on plastic frame in an outside edge area of the cover body; and
   a plurality of metal inserts molded into the plastic frame, said inserts combining to form a frame which extends along essentially the entire periphery of the cover and which is only partially embedded within the plastic frame;
   wherein each of the inserts is separated from an adjoining insert by an angled thermal expansion gap that extends transversely and longitudinally of the adjoining inserts such that an essentially continuous circumferential reinforcement of the frame is provided despite the presence of said gaps.

2. Cover as claimed in claim 1, wherein the plastic frame covers an outside edge area of the metal inserts, but leaves inside areas of the metal inserts exposed.

3. Cover as claimed in claim 1, wherein the metal inserts have an open-ended peripheral channel, a base of which adjoins a bottom of the cover body, the open end of each channel of one of the inserts facing the open end of the channel of a peripherally adjacent other of the inserts such that the ends of the channels of the inserts are axially aligned.

4. Cover as claimed in claim 3, wherein the plastic frame extends inwardly from the periphery of the cover as far as an outer wall of the peripheral channel.

5. Cover as claimed in claim 1, wherein the metal inserts comprise four parts in the peripheral direction of the cover, each insert part extending essentially along one of four sides of the cover body.

6. Cover as claimed in claim 1, further comprising cover holding devices on at least one of the insert parts.

7. Cover as claimed in claim 6, wherein the cover holding devices extend downward from the plastic frame.

8. Cover as claimed in claim 1, wherein the cover body is made of glass or a transparent plastic.

9. Cover as claimed in claim 1, wherein the plastic frame is made of PUR foam.

10. Cover as claimed in claim 1, wherein a side screen is formed as part of the plastic frame.

11. Cover for a motor vehicle roof comprising:
    a cover body;
    a peripherally molded-on plastic frame in an outside edge area of the cover body; and
    a plurality of metal inserts molded into the plastic frame, said inserts combining to form a frame which extends along essentially the entire periphery of the cover and which is only partially embedded within the plastic frame;
    wherein the metal inserts have an open-ended peripheral channel, a base of which adjoins a bottom of the cover body, the open end of each channel of the inserts facing the open end of the channel of a peripherally adjacent other of the inserts such that the open ends of the channels of the inserts are axially aligned.

* * * * *